United States Patent [19]
Springer et al.

[11] Patent Number: 5,352,566
[45] Date of Patent: Oct. 4, 1994

[54] METHOD OF MANUFACTURING OPTOELECTRONIC COMPONENTS

[75] Inventors: Johann Springer, Aichwald; Peter Kersten, Leonberg; Klaus-D. Matthies, Möglingen, all of Fed. Rep. of Germany

[73] Assignee: Alcatel N.V., Amsterdam, Netherlands

[21] Appl. No.: 20,743

[22] Filed: Feb. 22, 1993

[30] Foreign Application Priority Data

Feb. 29, 1992 [DE] Fed. Rep. of Germany ....... 4206328

[51] Int. Cl.$^5$ ............................................. G02B 6/10
[52] U.S. Cl. .................................. 430/321; 430/314; 430/315; 385/132
[58] Field of Search ............... 430/321, 323, 324, 325, 430/326, 314, 315, 317; 385/2, 5, 8, 132, 130, 143, 145; 156/643, 659.1

[56] References Cited

U.S. PATENT DOCUMENTS

| | | | |
|---|---|---|---|
| 3,561,964 | 2/1971 | Slaten | 430/321 |
| 4,136,439 | 1/1979 | Auracher et al. | 385/130 |
| 5,039,186 | 8/1991 | Man et al. | 385/122 |
| 5,093,883 | 3/1992 | Yoon et al. | 385/130 |
| 5,106,211 | 4/1992 | Chiang et al. | 385/132 |
| 5,143,577 | 9/1992 | Haas et al. | 156/625 |
| 5,170,461 | 12/1992 | Yoon et al. | 385/130 |
| 5,265,185 | 11/1993 | Ashley | 385/132 |

FOREIGN PATENT DOCUMENTS

| | | |
|---|---|---|
| 0445527 | 9/1991 | European Pat. Off. |
| 60-263102 | 12/1985 | Japan |
| 4-152672 | 5/1992 | Japan |
| 4-304416 | 10/1992 | Japan ....................... 385/2 |

OTHER PUBLICATIONS

P. Pantelis et al., "Organic Polymer Films for Nonlinear Optics," Br Telecom Technol. J, vol. 6, No. 3, Jul. 1988, pp. 5-17.

Roman Polz, "Möglichkeiten der integrierten Optik", Optoelektronik 26, Dec. 23, 1986, pp. 74-78.

Selvaraj et al., "Optical Interconnections Using Integrated Waveguides in Polyimide for Wafer Scale Integration", IEEE VLSI Multilevel Interconnection Conference, Jun. 15-16, 1978, pp. 306-313.

*Primary Examiner*—Charles L. Bowers, Jr.
*Assistant Examiner*—John A. McPherson
*Attorney, Agent, or Firm*—Spencer, Frank & Schneider

[57] ABSTRACT

Manufacturing of optoelectronic components in which an optical waveguide is made of an optically nonlinear (NLO) polymer, above and below of which is provided a buffer layer which carries at least one stripe electrode. The at least one stripe electrode is used as a mask to form the NLO polymer waveguide.

8 Claims, 2 Drawing Sheets

METHOD OF MANUFACTURING OPTOELECTRONIC COMPONENTS

BACKGROUND OF THE INVENTION

1. Field of the Invention

The present invention relates to a method of manufacturing optoelectronic components in which the optical waveguide is made of an optically nonlinear polymer and which include stripe electrodes arranged above and below the optical waveguide.

2. Background Information

Such optoelectronic components are known (article "Organic polymer films for nonlinear optics," Br. Telecom Technol. J., Vol. 6, No. 3, July 1988, pp. 5 to 17).

The known optoelectronic components are of a so-called sandwich construction, i.e., the stripe electrodes, the buffer layers, and the optical waveguide are arranged in layers one over the other. Optimum operation of an optoelectronic component, such as a directional coupler in which the optical waveguide is made of an optically nonlinear polymer, requires that the optical waveguide or waveguides be arranged extremely accurately with respect to the stripe electrodes, which act as drive electrodes. The optical waveguide itself has a width of a few µm, and the tolerances should be much less than 1 µm.

SUMMARY OF THE INVENTION

Accordingly, the technical problem underlying the invention is to provide a method of manufacturing optoelectronic components which makes it possible to arrange the stripe electrodes at a very short distance from and with high accuracy relative to the optical waveguide.

According to one solution, this technical problem is solved by a method comprising the following steps:

a) On a glass substrate provided with a layer of electrically conductive material, at least one stripe electrode is formed by a photolithographic technique,
b) the substrate is provided with a buffer layer of a polymer;
c) the surface of the buffer layer is provided with a protection resistant to oxygen plasma;
d) a further buffer layer of a polymer is deposited, and then coated with a positive photoresist;
e) the substrate is exposed from below;
f) the photoresist is developed, and the unexposed photoresist is removed;
g) a thin aluminum layer is deposited by evaporation;
h) the developed photoresist layer with the aluminum layer thereon is removed;
i) a channel is etched into the second buffer layer above the stripe electrode, using the aluminum layer as an etch mask;
j) the aluminum layer is removed;
k) a layer of an optically nonlinear polymer is deposited which also fills the channel;
l) a third buffer layer is formed, and
m) at least one further stripe electrode is formed on the third buffer layer.

In a further solution to the technical problem, the method comprises the following steps:

a) On a glass substrate provided with a layer of electrically conductive material, at least one stripe electrode is formed by a photolithographic technique;
b) the substrate is provided with a buffer layer of a photocuring polymer, which is cured;
c) a second buffer layer of a photocuring polymer is formed;
d) the second buffer layer is exposed from the underside of the substrate;
e) the unexposed portions of the second buffer layer are developed and removed;
f) a layer of an optically nonlinear polymer is deposited which also fills the channel created in the second buffer layer;
g) a third buffer layer is formed, and
h) at least one further stripe electrode is formed on the third buffer layer.

If optoelectronic components are manufactured by such methods, the accuracy requirements placed on them can be met.

BRIEF DESCRIPTION OF THE DRAWINGS

Advantageous details of the invention are defined in claims 4 to 7. The invention will now be explained with reference to FIGS. 1a–1j and 2a–2i, which illustrate the processing steps in the implementation of the methods according to the invention.

DETAILED DESCRIPTION OF THE PREFERRED EMBODIMENTS

Figure 1A:
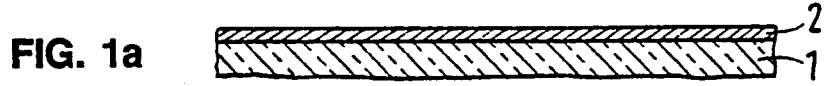
Figure 1B:
Figure 1C:
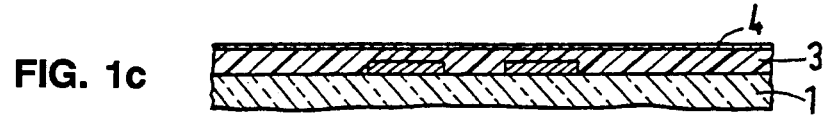

As can be seen in FIGS. 1a–1j, in FIG. 1a, the starting product for the manufacture of the optoelectronic component consists of the glass substrate I and the layer 2 deposited thereon, which is of an electrically conductive material, such as gold or aluminum. FIG. 1b shows the substrate 1 after those portions of the layer 2 which are not needed for the stripe electrodes and the leads thereto have been removed. This can be done, for example, by a conventional photolithographic technique. FIG. 1c shows the substrate I after a buffer layer 3 of a polymer has been deposited. The polymer may be a material related to the optically nonlinear polymers which contains none or only a few chromophores or in which the chromophores have been bleached out. The buffer layer is covered with a protective layer 4 against oxygen plasma. This layer 4 can be a thin oxygen-plasma-resistant layer, e.g., of silicon dioxide. It is also possible, however, to make a thin layer at the surface of the buffer layer 3 resistant to oxygen plasma by a chemical reaction, e.g., by silylation.

Figure 1D:
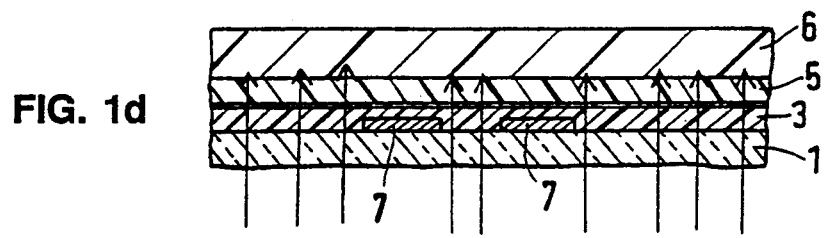
Figure 1E:

FIG. 1d shows the substrate 1 after a further buffer layer 5 has been deposited on the protective layer 4 covering the first buffer layer 3. This buffer layer 5 is covered with a layer 6 of a positive photoresist. If necessary, a thin solvent-resisting layer (not shown), e.g., of silicon dioxide ($SiO_2$) or silicon oxynitride ($SiO_xN_y$), may be applied prior to the deposition of the positive photoresist to the buffer layer 5. This layer will protect the second buffer layer when the photoresist is removed.

The arrows in FIG. 1d indicate that the substrate is exposed from below, with the stripe electrodes 7 acting as a mask. The positive photoresist is developed and the exposed areas are removed, leaving a structure according to FIG. 1e. The structure shown there has already been provided with a thin aluminum layer 8, which has been deposited by an electron beam evaporation technique, for example.

Figure 1F:
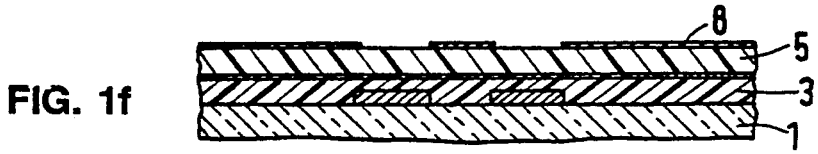

In the structure shown in FIG. 1f, the portions 9 of developed photoresist, which are still present in the structure of FIG. 1c, have been stripped, leaving the interrupted aluminum layer 8, which acts as an etch mask.

Figure 1G:
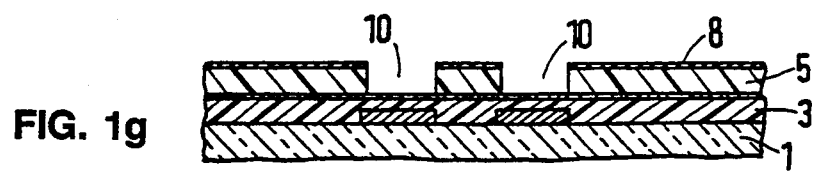

As can be seen in the structure according to FIG. 1g, there are now channels 10 in those areas which were not covered by the aluminum layer 8. These channels were formed by etching away the second buffer layer 5 there by reactive ion etching in an oxygen plasma.

Figure 1H:
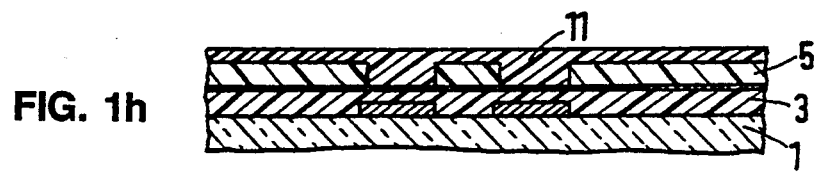

The structure according to FIG. 1h includes a further layer 11, which also fills the channels 10. This layer was deposited after the aluminum layer 8 has been removed. It is made of the optically nonlinear polymer. If necessary, the layer 11 may be densified by pressure, i.e., compressed.

Figure 1I:
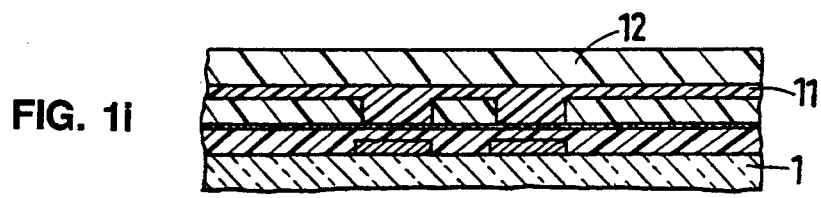
Figure 1J:
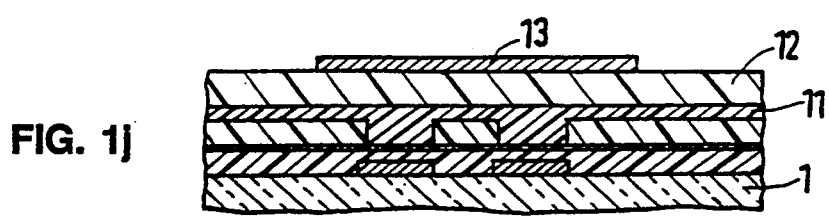

The structure according to FIG. 1i includes a further layer 12, namely the third or top buffer layer. The structure according to FIG. 1j shows the finished optoelectronic component, which was completed by depositing and patterning the top electrode 13.

Figure 2A:
Figure 2B:

FIGS. 2a–2i shows the various stages of a further method of manufacturing an optoelectronic component. As can be seen from FIG. 2a, the starting product for the manufacture of the optoelectronic component also consists of the glass substrate 1 and the layer 2 deposited thereon, which is of an electrically conductive material, such as gold or aluminum. FIG. 2b, like in the method illustrated in FIGS. 1a–1j, shows the substrate 1 after those portions have been removed from the layer 2 which are not needed for the stripe electrodes and the leads thereto.

Figure 2C:

FIG. 2c shows the substrate 1 after a buffer layer 14 of a photocuring polymer has been deposited and then cured by irradiation with UV light. The irradiation with UV light is indicated by arrows. The polymer can be, for example, an acrylate containing a photoinitiator. Instead of the photocuring polymer, a thermally cross-linkable polymer can be used. In that case, the irradiation with UV light must be replaced by a heat treatment.

Figure 2D:
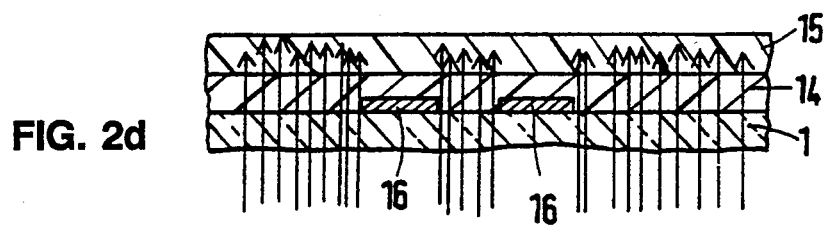
Figure 2E:
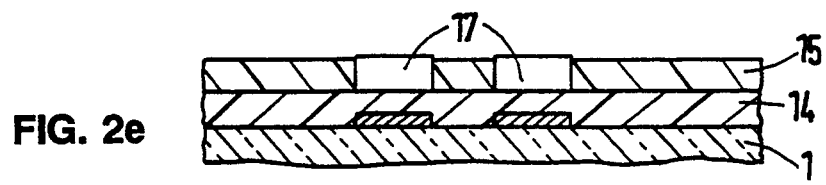
Figure 2F:
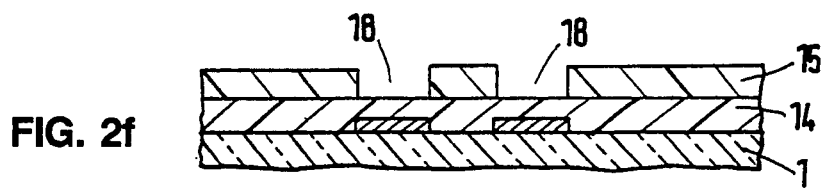

FIG. 2d shows the substrate I after a further buffer layer 15 of a photocuring polymer has been deposited. The arrows indicate that the structure according to FIGS. 2d is exposed from below, with the stripe electrodes 16 acting as a mask. In this operation, the exposed areas in the buffer layer 15 are cured, and the unexposed areas (shadowed by the stripe electrodes) are not cured. As can be seen from FIG. 2e, this leaves the uncured areas 17 in the buffer layer 15. The areas 17 are removed, leaving channels 18 in the buffer layer 15, as can be seen from FIG. 2f.

Figure 2G:
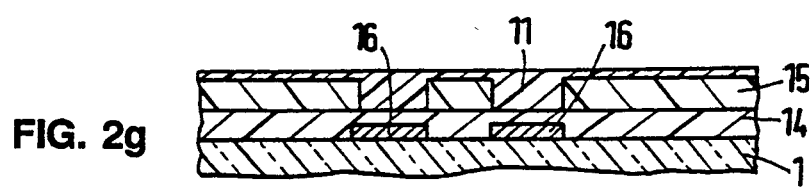
Figure 2H:
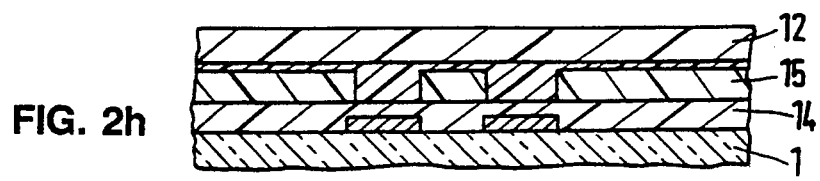
Figure 2I:
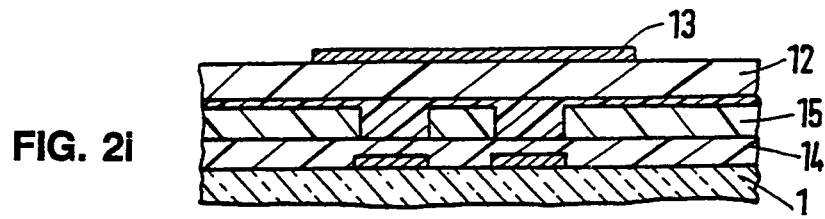

FIGS. 2g through 2i are identical with FIGS. 1g through 1j in the method of FIGS. 1a–1j. Like parts of the structure are therefore designated by the same reference characters as in FIG. 1.

We claim:

1. A method of manufacturing optoelectronic components in which an optical waveguide is made of an optically nonlinear polymer and which include stripe electrodes arranged above and below the optical waveguide, comprising the steps of:
   a) forming on a glass substrate provided with a layer of electrically conductive material, at least one stripe electrode by a photolithographic technique;
   b) providing the substrate with a buffer layer of a polymer, which is cured;
   c) providing the surface of the buffer layer with a protection resistant to oxygen plasma;
   d) depositing a second buffer layer of a polymer and then coating with a positive photoresist;
   e) exposing the substrate from below using the at lest one stripe electrode as an optical mask;
   f) developing the photoresist and removing the unexposed photoresist;
   g) depositing a thin aluminum layer by evaporation;
   h) removing the developed photoresist layer with the aluminum layer thereon;
   i) etching a channel into the second buffer layer above the stripe electrode, using the aluminum layer as an etch mask;
   j) removing the aluminum layer;
   k) depositing a layer of an optically nonlinear polymer which fills the channel;
   l) forming a third buffer layer; and
   m) forming at least one further stripe electrode on the third buffer layer.

2. A method of manufacturing optoelectronic components in which an optical waveguide is made of an optically nonlinear polymer and which include stripe electrodes arranged above and below the optical waveguide, comprising the steps of:
   a) forming on a glass substrate provided with a layer of electrically conductive material, at least one stripe electrode by a photolithographic technique;
   b) providing the substrate with a buffer layer of a photocuring polymer;
   c) forming a second buffer layer of a photocuring polymer;
   d) exposing the second buffer layer from an underside of the substrate using the at lest one stripe electrode as an optical mask;
   e) developing and removing the unexposed portions of the second buffer layer;
   f) depositing a layer of an optically nonlinear polymer which fills a channel created in the second buffer layer;
   g) forming a third buffer layer; and
   h) forming at least one further stripe electrode on the third buffer layer.

3. A method as claimed in claim 1, wherein as protection for the first buffer layer, a layer resistant to oxygen plasma is produced.

4. A method as claimed in claim 1, wherein as protection for the first buffer layer, the surface of the first buffer layer is changed by chemical treatment.

5. A method as claimed in claim 1 wherein prior to the deposition of the positive photoresist, the second buffer layer is provided with a solvent-resisting protection layer.

6. A method as claimed in claim 1 wherein the channel in the second buffer layer and in the protection layer is formed by reactive ion etching.

7. A method as claimed in claim 3, wherein prior to the deposition of the positive photoresist, the second buffer layer is provided with a solvent-resisting protection layer.

8. A method as claimed in claim 4, wherein the channel in the second buffer layer and in the protection layer is formed by reactive ion etching.

* * * * *